United States Patent [19]

Floreancig et al.

[11] 4,450,143

[45] May 22, 1984

[54] PROCESS FOR REDUCING THE ORGANIC SOLVENT LOSSES IN THE TREATMENT OF A SUSPENSION RESULTING FROM THE ACID ATTACK ON AN ORE

[75] Inventors: Antoine Floreancig, Saint-Genis-Laval; Bernard Siffert, Hoschstatt; Jean-Jacques Trescol, Nogent-sur-Oise, all of France

[73] Assignee: Pechiney, France

[21] Appl. No.: 279,529

[22] PCT Filed: Dec. 2, 1980

[86] PCT No.: PCT/FR80/00174

§ 371 Date: Jul. 1, 1981

§ 102(e) Date: Jul. 1, 1981

[87] PCT Pub. No.: WO81/01577

PCT Pub. Date: Jun. 11, 1981

[30] Foreign Application Priority Data

Dec. 5, 1979 [FR] France ................................. 79 30275

[51] Int. Cl.³ .................... C22B 60/02; C22B 34/22; C22B 34/34; B01D 11/00
[52] U.S. Cl. ........................................ 423/10; 423/54; 423/63; 423/658.5
[58] Field of Search .................. 423/10, 54, 63, 658.5; 75/101 R

[56] References Cited

U.S. PATENT DOCUMENTS

| | | | |
|---|---|---|---|
| 2,819,145 | 1/1958 | McCullough et al. | 423/10 |
| 2,830,872 | 4/1958 | McCullough | 423/10 |
| 2,833,616 | 5/1958 | Voiland | 423/10 |
| 2,860,031 | 11/1958 | Grinstead | 423/10 |
| 3,018,253 | 1/1962 | Grinstead | 252/364 |
| 3,295,932 | 1/1967 | Boutin et al. | 423/10 |
| 4,008,134 | 2/1977 | Thorsen | 75/101 R X |

OTHER PUBLICATIONS

Bailar, J. C., et al., Eds. *Comprehensive Inorganic Chemistry,* vol. 2, 1973, Pergamon Press, pp. 519–520.

*Primary Examiner*—Deborah L. Kyle
*Assistant Examiner*—Matthew A. Thexion
*Attorney, Agent, or Firm*—McDougall, Hersh & Scott

[57] ABSTRACT

A process for treating a hydrometallurgical suspension resulting from the acid attack on an ore containing at least one metal element to be put to use, and non-attackable mineral materials, a fraction of which is formed of clays, comprising extracting the useful metal element which has gone into solution in the attack operation, by means of an organic solvent belonging to the group of alkyl phosphates, which is characterized by introducing a condensed mineral phosphate into the ore attack medium, for the purpose of limiting the losses due to adsorption of the organic extraction solvent by the clays.

The process applies more particularly to uraniferous, molybdeniferous, vanadiferous and cobaltiferous ores.

8 Claims, No Drawings

PROCESS FOR REDUCING THE ORGANIC SOLVENT LOSSES IN THE TREATMENT OF A SUSPENSION RESULTING FROM THE ACID ATTACK ON AN ORE

The invention concerns a process for reducing the losses in respect of organic solvent, which is used to extract from an aqueous solution the metal element which is to be put to use, after it has been rendered soluble by acid attack on the ore containing it.

For a long time now, hydrometallurgy has provided the man skilled in the art with ore attack processes, for first solubilising the metal element required, while removing the materials which are not attacked under the operating conditions, and then separating the required metal element from the other elements which form the impurities which are made soluble in the attack operation.

Among the large number of existing processes, the specialist literature has already proposed processes for the acid attack on ores, such as for example uraniferous ores, molybdeniferous and vanadiferous ores, by means of a sulphuric liquor, in order to solubilise the metal element which is sought for use, such as uranium, molybdenum or vanadium, and so as easily to be able to separate the metal element from the gangue which is formed by all mineral products which cannot be attacked under the conditions of the hydrometallurgical process.

After the operation of attacking the ore has been carried out, the liquid and solid phases are separated by a known means, for example filtering, settling or centrifuging, and the liquid phase is then subjected to a treatment for extracting the metal element which is sought for use, by known means such as chemical precipitation, fixing the metal ion on an anionic ion-exchange resin, or extraction of the liquid-liquid type using a suitable organic solvent.

In the latter type of extraction operation, using an organic solvent for the metal element which is sought for use, the liquid phase which contains the metal element in solution is generally in a highly dilute condition as it is formed by the mixture of the liquid fraction originating directly from the attack operation and the water for washing the solid phase formed by the non-attacked mineral substances.

Hence, this extraction process suffers from the major disadvantage of being required to treat a very substantial amount of aqueous solution, by means of the organic extraction solvent, thereby requiring large-volume installations and high levels of treatment costs.

Because the volume of the aqueous solution to be treated by the organic solvent is excessive in many cases, it has been proposed (Canadian Pat. No. 756,991) that the suspension resulting from the acid attack on the ore might be treated by means of an organic extraction solvent. This process comprises counter-current circulation of the suspension originating from the operation of attack on the ore and the organic solvent in a vertical extraction zone, the organic solvent being introduced into the lower part of the extraction zone in the form of globules with a minimum diameter of 0.1 mm, the globules migrating in counter-current through the suspension, by virtue of the low specific gravity of the globules, to be collected in the upper part of the extraction zone.

Although the process is highly attractive in regard to the basic principle thereof, by virtue of the liquid-liquid exchange which occurs in the extraction zone between the aqueous solution containing the desired metal and the organic solvent, the process has been found to suffer from major disadvantages which restrain the use of such a process.

Of the disadvantages which have been found, one is particularly troublesome because it results in substantial losses in respect of organic extraction solvent, due to the solvent being adsorbed by the solid phase of the suspension.

The applicants considered that the process disclosed in the Canadian patent was an interesting one and therefore searched for the reasons for the organic extraction solvent being adsorbed by the solid phase resulting from the ore attack operation. By means of many laboratory experiments, the applicants discovered that the organic extraction solvent was adsorbed by the clays present in the gangue of the ore, while the adsorbed amount of the solvent may vary between 10 g and 30 g per kilo of clay in the ore before the attack operation.

Now, the specialist literature teaches that the great majority of ores contain a gangue which has a particularly variable clay content.

Thus, whenever the man skilled in the art carries out the operation of attacking an ore and extracting the metal element to be put to use from the suspension resulting from the attack operation, by using an organic solvent, the man skilled in the art encounters a loss of organic extraction solvent which increases in proportion to an increasing clay content in the ore.

In consideration of the major disadvantages referred to above, the applicants, continuing their research, discovered and developed a process for reducing the losses in respect of organic extraction solvent in the treatment of aqueous suspensions resulting from the acid attack on ores with a more or less clayey gangue.

The process according to the invention, the aim of which is to limit the losses in respect of organic extraction solvent by adsorption of said solvent by the clays in the gangue, comprises introducing into the ore acid attack medium an adsorption-inhibiting agent containing condensed phosphated ions.

The ores which can be subjected to acid attack and extraction of the useful metal element by an organic solvent are more particularly uraniferous, molybdeniferous, vanadiferous, cobaltiferous, etc ores.

Such ores comprise a more or less clayey gangue which contains one at least of the following clays:
Illite: $K_2O$, $MgO$, $Al_2O_3$, $SiO_2$, $H_2O$
Kaolinite: $Al_2O_3$, $2\ SiO_2$, $2\ H_2O$
Montmorillonite: $(Mg,Ca)O$, $Al_2O_3$, $5\ SiO_2$, $nH_2O$
Halloysite: $Al_2O_3$, $2\ SiO_2$, $(OH)_4$, $nH_2O$ The metal element which can be put to use, which goes into aqueous solution in the course of the acid attack on the ore, is generally interpreted by the man skilled in the art as defining the metal, such as for example uranium, vanadium, molybdenum or cobalt. However, without thereby excluding the possibility of extracting other metals which are considered as being impurities: this is the case for example with uraniferous ores in which the uranium is often accompanied by molybdenum.

The extraction solvent which is used in an extraction process using an organic solvent for extracting the metal element which is to be put to use, is selected from $C_{10}$ to $C_{24}$ alkyl phosphate acids such as for example 2-diethylhexylphosphoric acid which is dissolved in an organic solvent which is insoluble in the aqueous medium, such as for example kerosene or dodecane.

The agent for inhibiting adsorption of the organic extraction solvent by the clays, which is used in the process according to the invention, generally comprises condensed phosphates which are known at the present time:

metaphosphates with cyclic anions of the formula $M_n(PO_3)_n$ occurring in the form of salts of trimeric, tetrameric and hexameric acids such as for example sodium hexametaphosphate $Na_6(PO_3)_6$, polyphosphates with anions in chain configurations, having the formula $M_{n+2}(P_nO_{3n+1})$ in which n may be of values between 1 and 10, such as for example orthophosphates, pyrophosphates, triphosphates, tetraphosphates, etc, isometaphosphates in which the anions are combinations of cyclic anions and long-chain anions, and polyphosphates with transverse bonds between the chains, formed by oxygen atoms.

The condensed phosphates are generally used in the form of alkali salts.

The amount of such condensed phosphates which is brought into contact with the suspension resulting from the acid attack on the ore may vary within wide limits such as from 1 mole to 100 moles per tonne of ore. Preferably, the amount used is between 5 moles and 80 moles per tonne of ore.

Generally, the adsorption inhibiting agent which is formed by at least one condensed phosphate is introduced as it is or in the form of an aqueous solution, into the medium to be treated.

In practice, the inhibiting agent formed by condensed phosphates is introduced into the attack medium after the initially crushed ore has been subjected to the acid attack step, until the metal element sought is made soluble. However, it is also possible for the inhibiting agent to be introduced at the same time as the ore, that is to say, before the attack operation begins, or, in the course of the attack operation itself.

In addition, if the phosphate-bearing inhibiting agent is introduced subsequent to the ore attack step, that is to say, into the suspension resulting from the acid attack operation, the inhibiting agent may be introduced before, at the same time as or after the organic extracting solvent for extracting the desired metal element is introduced into the attack medium.

The treatment for inhibition in respect of the clays in the ore gangue is generally effected at a temperature of from 15° to 100° C. but preferably from 40° C. to 80° C.

Thus, the usual conditions which are well known to the man skilled in the art, in regard to acid attack on ores, are not altered by the introduction of the phosphate-bearing inhibiting agent.

The invention will be better appreciated by reference to the following examples which are given by way of illustration.

EXAMPLE 1

In order to show that clay is the reason for the loss due to adsorption of the organic solvent used for extracting the useful metal element, for example uranium, a kilo of kaolinite of the following composition: $Al_2O_3$, $2 SiO_2$, $2H_2O$, was put in suspension in an aqueous solution of sulphuric acid with a pH-value of 1.5.

The suspension was then raised to a temperature of 60° C. and held at that temperature for a period of 4 hours, while being subjected to agitation.

The resulting suspension was then brought into contact with an organic extraction solution containing 0.1 mole of 2-diethylhexylphosphoric acid in dodecane.

After the mixture of the suspension and the organic extraction solution was subjected to agitation for 30 minutes in order to establish the most intimate possible contact between the suspension and the solution, the phases were separated by settling, giving:
an aqueous phase
an organic phase
a solid phase.

It was then possible to ascertain that 5.7 g of 2-diethylhexylphosphoric acid had been adsorbed by the kilo of kaolinite.

In order to demonstrate the substantial improvement achieved by the process of the invention, the tests set out hereinafter were carried out on 1 kilo of kaolinite, producing the same suspension as previously, which was further treated with the same organic extraction solution under the same conditions in respect of pH-value, time, temperatures and agitation, but with the addition to said suspension of variable amounts of pyrophosphates (condensed phosphates) in the form of an aqueous solution, in order to ascertain the extent of fixing of the phosphoric ions by the active locations of the clay.

The following results as set forth in Table I below were obtained:

TABLE I

| Test | Amount of pyrophosphate added in mole/tonne of clay | Amount of 2-diEHPA adsorbed per kilo of kaolinite |
|---|---|---|
| Test a (ref) | 0 | 5.7 |
| Test b | 1 | 5.0 |
| Test c | 5 | 3.75 |
| Test d | 10 | 3.60 |
| Test e | 50 | 0.09 |

This Table shows that, in accordance with the invention, it is possible to prevent the adsorption of 2-diethylhexylphosphoric acid by kaolinite, by introducing condensed phosphates into the treatment medium. It is also found that the whole of the organic extraction solvent which was introduced into the suspension is recovered.

EXAMPLE 2

In this Example, the applicants wanted to show that the presence of another clay like montmorillonite of the following composition: $(Mg,Ca)O$, $Al_2O_3$, $5SiO_2$, $nH_2O$, caused the same effects in respect of adsorption of the organic extraction solvent, as in Example 1.

The applicants also wanted to show that such effects could be completely inhibited by the presence of the pyrophosphates according to the invention.

For that purpose, the applicants carried out the tests defined hereinafter, it being appreciated that the operations of preparing the suspension of montmorillonite in the sulphuric solution, contact with the organic extraction solvent, introduction of the condensed phosphates and separation of the phases produced, are the same operations as those set forth in Example 1.

The results have been set out in condensed form in Table II below:

TABLE II

| Test | Amount of pyrophosphate added in mole/tonne of clay | Amount of 2-diEHPA adsorbed per kilo of montmorillonite |
| --- | --- | --- |
| Test f (ref) | 0 | 6.35 |
| Test g | 1 | 2.85 |
| Test h | 10 | 1.60 |
| Test i | 50 | 1.00 |
| Test j | 100 | 0.30 |

The table confirms that the clay such as montmorillonite is the cause of adsorption of 2-diethylhexylphosphoric acid, and that introducing a given amount of pyrophosphates (condensed phosphates) into the sulphuric suspension of that clay makes it possible to prevent the organic solvent from being adsorbed by the active locations of the montmorillonite and for it to be virtually completely recovered at the end of the extraction step.

EXAMPLE 3

In this Example, the applicants wanted to show that, by using another condensed phosphate, in the present case tripolyphosphate, on kaolinite, which was already the subject of experiment in Example 1, a virtually identical result was obtained.

Six tests were carried out, the modes of operation of which were the same as those performed in Example 1.

The results are set out in Table III below.

TABLE III

| Test | Amount of tripolyphosphate added in mole/tonne of clay | Amount of 2-diEHPA adsorbed per kilo of kaolinite |
| --- | --- | --- |
| Test k (ref) | 0 | 5.7 |
| Test l | 1 | 2.8 |
| Test m | 5 | 2.6 |
| Test n | 10 | 1.8 |
| Test p | 25 | 0.17 |
| Test q | 50 | 0.06 |

This Table shows us that, in the absence of condensed phosphates (tripolyphosphate), a relatively substantial amount of organic extraction solvent is adsorbed. As soon as tripolyphosphate is introduced in quantity into the sulphuric suspension of kaolinite, adsorption of the organic solvent by the clay is virtually inhibited and the results obtained are virtually the same as those set forth in Examples 1 and 2.

EXAMPLE 4

In this Example, the applicants used the same clay as in Example 2, which they treated with a metaphosphate.

Three tests were carried out, with the modes of operation thereof being the same as in Example 1.

The results are set out in Table IV below:

TABLE IV

| Test | Amount of metaphosphate added in mole/tonne of clay | Amount of 2-diEHPA adsorbed per kilo of montmorillonite |
| --- | --- | --- |
| Test r (ref) | 0 | 6.35 |
| Test s | 6 | 5.0 |
| Test t | 60 | 2.15 |

This Table shows us that, in the absence of condensed phosphates (metaphosphates), the adsorption which results is virtually identical to the degrees of adsorption already found in the previous Examples.

After the metaphosphates were introduced into the sulphuric suspension of montmorillonite, the level of adsorption of organic solvent is three times less than when there are no metaphosphates.

EXAMPLE 5

In a first experiment relating to the prior art, 100 kg of a uraniferous ore which was crushed to a size of less than 0.7 mm and which was of the following composition:
Uranium: 2700 ppm
Feldspar: 10%
Quartz: 79%
Clay: 6%
was introduced into an attack reaction vessel.

The clay present in the ore comprised a mixture of:
Kaolinite: 35%
Illite: 35%
Montmorillonite: 30%

This mass was attacked with 100 liters of a sulphuric liquor containing 60 g/l of $H_2SO_4$ for a period of 4 hours at a temperature of 60° C., while being subjected to agitation.

The suspension produced after the attack operation, the pH-value of which was 1.5, was treated in a counter-current mode with 30 liters of a solution of 2-ethylhexylphosphoric acid (2-diEHPA) in kerosene, at a level of concentration of 0.2 mole per liter of kerosene, to extract the uranium which was rendered soluble in the aqueous liquor in the course of the attack operation.

The uranium extraction conditions were the same as those used for the attack operation, that is to say, the extraction operation was carried out in a suspension which was subjected to agitation and the temperature of which was 60° C.

The organic solution containing the uranium extracted from the extraction medium was recovered.

It could be shown that the amount of 2-diEHPA adsorbed by the clays in the ore represented a loss of 2.3 g/kg of ore.

In another experiment which was performed with 100 kg of the same ore, and which was attacked under the above-indicated conditions, 0.3 kg of tripolyphosphate was introduced, for the 100 kg of ore, that is to say, 8 moles of tripolyphosphate per tonne of ore, at the end of the attack operation and in accordance with the invention.

Then, the resulting solution which had a pH-value of 1.5 was treated in a counter-current mode with 30 liters of a solution in kerosene of 2-diethylhexylphosphoric acid (2-diEHPA), in a proportion of 0.2 mole per liter of kerosene, in order to extract the uranium which was solubilised in the aqueous liquor in the course of the attack operation, in accordance with the conditions in respect of agitation, temperature and time, as referred to above.

The organic extraction solution (2-diEHPA) was then separated from the medium resulting from the attack operation.

It could be shown that the amount of extraction solvent (2-diEHPA) adsorbed by the clays represented a weight of 0.3 kg per tonne of treated ore, that is to say, 0.3 g/kg of ore.

Thus, the amount of organic solvent used for extraction of the uranium and adsorbed by the clay was 8 times less in the experiment using tripolyphosphate than in the experiment which was conducted in accordance with the prior art.

We claim:

1. A process for treating a hydrometallurgical suspension resulting from the acid attack on an ore containing at least one metal element which is to be put to use, and non-attackable mineral materials, a fraction of which is formed by clays, comprising extracting the useful metal element which has gone into solution in the attack operation, by means of an organic solvent belonging to the group formed by alkylphosphate acids, characterised in that, in order to limit the losses due to adsorption of the organic extraction solvent by the clays, a condensed mineral phosphate is introduced into the ore attack medium.

2. A treatment process according to claim 1 characterised in that the condensed phosphate selected from the group consisting of metaphosphates, polyphosphates, combinations of metaphosphates which contain both cyclic anion and long chain anions, or transverse-bound phosphates.

3. A treatment process according to claim 1 characterised in that the condensed mineral phosphate is introduced before, during or after the ore attack operation.

4. A treatment process according to claim 1 characterised in that the condensed phosphate is introduced before, at the same time as or after the organic solvent for extracting the useful metal element.

5. A treatment process according to claim 1 characterised in that the amount of condensed phosphate to be introduced into the attack medium is from 1 mole per tonne of ore to be treated to 100 moles per tonne of ore to be treated.

6. A treatment process according to claim 1 characterised in that the condensed phosphate is introduced into the attack medium in the form of an aqueous solution.

7. A treatment process according to claim 1 characterised in that said attack medium is maintained at a temperature from 15° to 100° C. during the introduction of said condensed phosphate.

8. A treatment process according to claim 7 wherein such temperature is between 40° C. and 80° C.

* * * * *